United States Patent
Romenesko et al.

(10) Patent No.: US 7,405,251 B2
(45) Date of Patent: Jul. 29, 2008

(54) FLAME RETARDANT COMPOSITIONS

(75) Inventors: David Joseph Romenesko, Midland, MI (US); Randall Gene Schmidt, Midland, MI (US); Atsushi Togashi, Midland, MI (US); Gary Michael Wieber, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 287 days.

(21) Appl. No.: 10/512,733

(22) PCT Filed: May 15, 2003

(86) PCT No.: PCT/US03/15331

§ 371 (c)(1),
(2), (4) Date: May 27, 2005

(87) PCT Pub. No.: WO03/097745

PCT Pub. Date: Nov. 27, 2003

(65) Prior Publication Data

US 2006/0252890 A1 Nov. 9, 2006

Related U.S. Application Data

(60) Provisional application No. 60/381,654, filed on May 16, 2002.

(51) Int. Cl.
*C08L 83/05* (2006.01)
*C08L 69/00* (2006.01)
*C08L 55/02* (2006.01)

(52) U.S. Cl. ............... 524/161; 524/265; 524/266; 524/267; 524/268; 524/394; 525/464; 528/31

(58) Field of Classification Search ............. None
See application file for complete search history.

(56) References Cited

U.S. PATENT DOCUMENTS

| | | | |
|---|---|---|---|
| 5,100,958 A | 3/1992 | Fuhr et al. | 525/66 |
| 5,352,747 A | 10/1994 | Ohtsuka et al. | 525/464 |
| 5,484,867 A | 1/1996 | Lichtenhan et al. | 528/9 |
| 5,614,603 A * | 3/1997 | Harkness et al. | 528/14 |
| 5,904,791 A | 5/1999 | Bearinger et al. | 156/89.11 |
| 5,972,512 A | 10/1999 | Boisvert et al. | 428/409 |
| 6,451,906 B1 * | 9/2002 | Saito et al. | 524/588 |
| 6,518,357 B1 | 2/2003 | Rajagopalan et al. | 524/588 |
| 6,727,303 B2 * | 4/2004 | Ono et al. | 524/261 |
| 2001/0018486 A1 | 8/2001 | Lichtenhan et al. | 524/588 |
| 2001/0044484 A1* | 11/2001 | Hatanaka et al. | 524/261 |
| 2002/0055563 A1* | 5/2002 | Asano et al. | 524/100 |

FOREIGN PATENT DOCUMENTS

| | | |
|---|---|---|
| EP | 0 829 521 | 3/1998 |
| EP | 0 918 073 | 5/1999 |
| EP | 1 094 093 | 4/2001 |
| EP | 1 127 921 | 8/2001 |
| EP | 1 026 204 | 6/2004 |
| JP | 3-48738 | 3/1991 |
| JP | 10-139996 | 5/1998 |
| JP | 11-140294 | 5/1999 |
| JP | 11-217494 | 8/1999 |
| JP | 2000-212460 | 8/2000 |
| JP | 2000-226527 | 8/2000 |
| JP | 2000-302961 | 10/2000 |
| JP | 2001-31771 | 2/2001 |
| WO | WO99/28387 | 6/1999 |
| WO | WO99/40158 | 8/1999 |

OTHER PUBLICATIONS

NEC Publication Polymers Advanced Technology vol. 9, pp. 593-600 (1998).
NEC Publication NEC Research & Development vol. 39, No. 2, Apr. 1998.
Abstract for JP2001152004A, 20010605, Horie et al., "Flame-retardant resin composition useful in electrical appliances comprises polycarbonate resin, silicon resin constructed from siloxane units and anti-drip agent".
Silicone Handboo, Chapters 12 and 13 (pp. 466-515) edited by Kunio Ito (Nikkan Kogyo Shinbun-sha (1990)). This is in Japanese—no translation.

* cited by examiner

*Primary Examiner*—David Buttner
(74) *Attorney, Agent, or Firm*—Patricia M. Scaduto

(57) ABSTRACT

This invention relates to a flame retardant composition comprising: (a) 81 to 99.99 weight percent of a thermoplastic resin, thermoset resin, thermoplastic resin blend, or thermoset resin blend which upon burning forms a char and (b) 0.01-19 weight percent of a silsesquioxane resin having a weight average molecular weight of greater than 300.

20 Claims, No Drawings

FLAME RETARDANT COMPOSITIONS

CROSS REFERENCES TO RELATED APPLICATIONS

The present application is a U.S. national stage filing under 35 USC 371 and claims priority from PCT application Ser. No. PCT/USS03/15331 filed on May 15, 2003 and U.S. application Ser. No. 60/381,654 filed on May 16, 2002. The above applications are incorporated by reference in their entirety.

DESCRIPTION

Phenyl silsesquioxane resins are well known in the art as attractive non-halogen fire retardants for aromatic containing thermoplastics such as polycarbonate. However, they currently must be used with a Teflon® additive to prevent dripping during initial burn in order to successfully meet desired UL 94 V0 status. The Teflon® additive, a halogen-containing material, not only adds cost but also reduces transparency of clear thermoplastics such as polycarbonate. It has been discovered that silicon-bonded hydrogen-containing phenyl silsesquioxane resins provide UL94 V0 status to polycarbonate without the use of Teflon® enabling a transparent non-halogen solution to this need. In addition, these materials harden the char and thus lower the rate of heat release, of char forming polymers such as polyesters including polycarbonate, polybutylene terephthalate (PBT), polycyclomethylene terephathalate (PCT), polyethylene terephthalate (PET), polymers such as polyether sulphone (PES), polyphenylene sulfide (PPS), polyphenylene ether (PPE), and phenolics, nitrogen containing polymers such as thermoplastic urethanes (TPUs) and polythalamides among others.

The patents and publications that form the background art for this invention are EP 1 026 204 A2, Japanese Patent Publication No. 2000212460 A, Japanese Patent Publication No. 11140294 A, Japanese Patent Publication No. 2000226527 A, Japanese Patent Publication No. 2001031771 A2, EP 0 918 073 A2, Japanese Patent Publication No. 10139996 A, EP 0 829 521 A1, Japanese Patent Publication No. 2000302961 A, PCT Patent Publication No. WO99/28387, Japanese Patent Publication No. 11217494 A2, Japanese Patent Publication No. 2001152004 A2, Japanese Patent No. 3048738 B2, PCT Patent Publication No. WO99/40158, U.S. Pat. No. 5,100,958, EP 1 094 093 A2, EP 1 127 921 A1, NEC Publication Polymers Advanced Technology Vol. 9, pages 593-600 (1998), and NEC Publication NEC Research. & Development Vol. 39, No. 2, April 1998.

This invention relates to a flame retardant composition comprising: (a) 81 to 99.99 weight percent of a thermoplastic resin, thermoset resin, thermoplastic resin blend, or thermoset resin blend which upon burning forms a char and (b) 0.01 to 19 weight percent of a silsesquioxane resin having a weight average molecular weight of greater than 300 and having the average molecular formula:

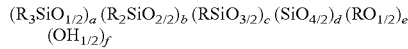

wherein each R is hydrogen, an alkyl group, an alkenyl group, or an aryl group having from 6 to 12 carbon atoms, a and b are zero or positive numbers and the value of a+b is greater than zero, c is a positive number, and d, e and f are zero or positive numbers with the provisos that the copolymer comprises at least 40 mole percent of $RSiO_{3/2}$ units, the copolymer comprises less than 10 mole percent $SiO_{4/2}$ units, greater than 30 mole percent of the silicon-bonded R groups are silicon-bonded aryl groups, greater than 0.5 mole percent of the silicon-bonded R groups are silicon-bonded hydrogen atoms, the content of silicon-bonded hydroxyl groups is equal to or less than 2 weight percent, and the content of silicon-bonded alkoxy groups where the alkoxy group is methoxy or ethoxy is equal to or less than 5 weight percent.

Component (a) is a thermoplastic resin, thermoset resin, thermoplastic resin blend, or thermoset resin blend which upon burning forms a residue (char). This char is improved by using Component (b), to be harder and thus lower the rate of heat release due to less fuel evolving per unit time during burning. Ideally, the char would ceramify to a glass and "insulate" the surface from the external flux and other ignition sources and thus have a lower Heat Release Rate.

Component (a) can be a thermoplastic resin exemplified by polycarbonates, polyamides exemplified by Nylons such as polycaprolactam (Nylon-6), polylauryllactam (Nylon-12), polyhexamethyleneadipamide (Nylon-6,6), and polyhexamethylenedodecanamide (Nylon-6,12), and blends of Nylons with other polymers, polyesters exemplified by polybutylene terephthalate (PBT), polyethylene terephthalate (PET), and polyethylene naphthalate (PEN), blends of polycarbonates with other polymers as exemplified by polycarbonate-acrylonitrile-butadiene-styrene (PC/ABS) blends and polycarbonate-polybutylene terephthalate (PC/PBT) blends, polyphenylene ether (PPE), polyphenyleneoxide (PPO), and blends of PPE or PPO with styrenics such as HIPS, polystyrene, acrylonitrile-butadiene-styrene-(ABS), SAN, polyphenylene sulfide (PPS), polyether sulphone (PES), polyaramids, polyimides, phenyl-containing resins having a rigid rod structure, styrenic materials exemplified by ABS (acrylonitrile-butadiene-styrene), polystyrene (PS), and high-impact polystyrene (HIPS), polyacrylates, styrene-acrylonitrile resins (SAN), halogenated plastics exemplified by polyvinyl chloride, fluoroplastics, and any other halogenated plastics, polyketones, polymethylmethacrylate (PMMA), thermoplastic elastomers such as thermoplastic urethanes, thermoplastic vulcanizates, and styrene ethylene butylene styrene (SEBS) copolymer, and natural products such as cellulosics, rayon, and polylactic acid. Component (a) can also be a blend of any of the thermoplastic resins described above.

Component (a) can also be a thermoset material. The thermoset material exemplified by epoxy resins, phenolic resins, urethane elastomers, and blends thereof, and also includes any thermoset material which involves mixing one component with another allowing curing to make a thermoset material and component (b) is therein.

In the formula for Component (b), R can be a hydrogen atom, an alkyl group exemplified by methyl, ethyl, propyl, butyl, pentyl, hexyl, octyl, decyl, and dodecyl, an alkenyl group exemplified by vinyl, allyl, butenyl, pentenyl, hexenyl, octenyl, and decenyl, or an aryl group having from 6 to 12 carbon atoms exemplified by phenyl, naphthyl, methylphenyl, ethylphenyl, chlorophenyl, bromophenyl and fluorophenyl.

Component (b) can thus be selected from

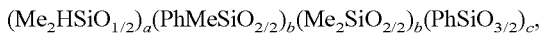

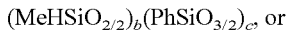, or

.

The copolymer comprises at least 40 mole percent of $RSiO_{3/2}$ units, with copolymer typically comprising from 60 mole percent to 90 mole percent of $RSiO_{3/2}$ units. The copolymer comprises less than 10 mole percent $SiO_{4/2}$ units, and typically the copolymer will comprise less than 5 mole percent of $SiO_{4/2}$ units. Greater than 30 mole percent of the silicon-bonded R groups are silicon-bonded aryl groups and typically from 50 to 80 mole percent of the silicon-bonded R groups are silicon-bonded aryl groups. Greater than 0.5 mole percent of the silicon-bonded R groups are silicon-bonded hydrogen atoms, with the mole percent of silicon-bonded R groups that are silicon-bonded hydrogen atoms typically being from 1 to 5 mole percent. The content of silicon-bonded hydroxyl groups is equal to or less than 2 weight percent, and is typically from 0.5 to 1.2 weight percent. The content of silicon-bonded alkoxy groups where the alkoxy group is methoxy or ethoxy is equal to or less than 5 weight percent.

The siloxane resin of Component (b) is prepared by methods well known in the art such as those described, for example, in the Silicone Handbook, Chapters 12 and 13 (pp 466-515) edited by Kunio Ito (Nikkan Kogyo Shinbun-sha (1990)). These methods include the hydrolysis of mixtures containing the corresponding chlorosilanes or alkoxysilanes and continuing the reaction until the desired molecular weight is achieved.

The flame retardant compositions of this invention can further comprise a sodium-containing catalyst. The sodium-containing catalyst is exemplified by organosodium materials such as sodium toluene sulfonate, or sodium stearate. The amount of catalyst used can be from 0.005 to 2 weight percent, but generally comprise from 0.01 to 0.05 weight percent, said weight percent being based on the total weight of the composition.

The flame retardant compositions of this invention can further comprise polytetrafluoroethylene powder (TEFLON®) or Dyneon®TF PTFE). The flame retardant compositions of this invention may comprise up to 10 weight percent of polytetrafluoroethylene powder, but generally comprise from 1 to 3 weight percent of polytetrafluoroethylene powder, said weight percent being based on the total weight of the composition. The flame retardant compositions of this invention are useful as clear housings for electronic devices such as computer monitors or housings, should the compositions be clear. Otherwise the compositions are useful as fire resistant compositions in a variety of electronic devices. Relatively low loadings of polytetrafluoroethylene powder were used in the examples disclosed here to maintain moderate to high clarity.

The Fire Test in the Examples hereinbelow was the test described by Underwriters Laboratories Corporate Headquarters 333 Pfingsten Road Northbrook, Ill. 60062-2096 USA (UL94). A description of the test is included by reference to UL.

An additional fire test, ASTM E 1354, described by American Society for testing and Materials 1916 Race St, Philadelphia, Pa. 19103. A description of the test is included by reference to the ASTM.

Ingredients:

Thermoplastic Resins:
  CALIBRE® 200-22 (polycarbonate resin)
  MAGNUM® 941 (acrylonitrile-butadiene-styrene resin), and
  PELLEFTHANE® 2355-75A (polyurethane elastomer resin) all which are available from The Dow Chemical Company, Midland, Mich.

TEFLON® 6C (polytetrafluoroethylene powder made by E. I. DuPont de Nemours of Wilmington, Del.)

EMERGE® 8500 (translucent, ignition resistant polycarbonate available from The Dow Chemical Company, Midland, Mi.).

AMOCO® 4018 (Polypropylene homopolymer, having a density of 0.906 g/cc and a melt flow index of 13.5, Amoco Oil Company Corporation, Chicago, Ill.)

CRASTIN® 6129 (thermoplastic polyester resin made by E.I. du Pont de Nemours and Company Wilmington Del.).

ELTESOL ST-90 (sodium toluene sulfonate available from Albright & Wilson Company). This was used as the Char Catalyst in the Examples below.

The masterbatches containing the siloxane resin were prepared using each of the resins below with the following formulation:

| Masterbatch | Formulation |
| --- | --- |
| Thermoplastic Resin or Thermoplastic Resin Blend | balance to 100 weight percent |
| Silsesquioxane Resin | 8, 10 or 50 weight percent |
| Char Catalyst | Zero or 0.3 weight percent |
| Polytetrafluoroethylene Powder | Zero or 3.0 weight percent |

Procedure for Preparing Masterbatch:
  Heat Haake bowl to 220° C. or about 50° C. above Tg (glass transition temperature) of the candidate plastic or blend.
  Place Thermoplastic Resin or Thermoplastic Resin Blend into the bowl and bring it to a melt using 100 rpm mixing.
  Place Silsesquioxane Resin in bowl, mix for about 2 minutes.
  Add Char Catalyst.
  Add Polytetrafluoroethylene Powder (if desired) and mix 5 minutes.
  Remove Masterbatch cool and powder/pelletize in chopper.
  The Masterbatch was then mixed with the appropriate thermoplastic resin at a weight ratio of thermoplastic resin to Masterbatch of 10:1 in a twin-screw extruder.

UL 94 Fire Test Specimens
  Injection molded 3.2 mm bars and a 4×4 inch 1 mm thick plaque. The plaques were cut to 0.5-inch wide rectangular specimens and the edges sanded to minimize fibrils.

Fire Testing
  UL 94 Fire Test described above.
  ASTM E 1354 Fire Test Specimens
  Injection molded 4×4 inch×3/16-inch thick (100×100×9.75 mm) plaque.

Fire Testing
  ASTM E 1354 Fire Test described above administered at 90 kW/m2 cone external heat flux on a Dark Star model Cone Calorimeter software modified by Fire Testing Technology Limited P.O. Box 116, East Grinstead, West Sussex, RH19 4FP, United Kingdom.

EXAMPLE 1

Masterbatch containing a silsesquioxane resin having the average molecular formula $(Me_2HSiO_{1/2})_{0.20}$ $(PhSiO_{3/2})_{0.78}$ $(PhMeSiO_{2/2})_{0.01}$ $(Me_2SiO_{2/2})_{0.01}$ where Me denotes methyl and Ph denotes phenyl.

Isopropanol (559.5 g) was added to phenyltrichlorosilane (1970.8 g), then diluted with toluene (1924.7 g). This mixture was added to heated (to a temperature of 50° C.) deionized water (6737.4 g) and the resulting reaction mixture heated to 65° C. for one hour. The aqueous phase was removed and the organic phase washed with deionized water and saturated aqueous NaHCO$_3$. To facilitate the final separation, additional toluene (1082 g) was added. Residual water was removed from the organic phase via azeotropic distillation and the reaction product concentrated to a ~65 wt % solution. Dimethylchlorosilane (450.1 g) was added to a portion of this solution (1500.1 g) and the mixture heated to 35° C. for 4.5 hours, then stirred at ambient temperature for three days. Volatiles (250 g) were removed by distillation, then isopropanol (150 g) and toluene (480 g) added. Additional volatiles (668 g) were removed by distillation. Deionized water (97.5 g), dimethoxyethane (500 g) and toluene (160 g) were added, then all volatile materials removed by distillation at ambient pressure, then under reduced pressure. The hot molten product was poured onto a cooled metal surface. The resulting product was isolated as a friable solid. The product was identified by $^{29}$Si NMR as a silsesquioxane resin having the average molecular formula: (Me$_2$HSiO$_{1/2}$)$_{0.20}$ (PhSiO$_{3/2}$)$_{0.78}$ (PhMeSiO$_{2/2}$)$_{0.01}$ (Me$_2$SiO$_{2/2}$)$_{0.01}$ where Me denotes methyl and Ph denotes phenyl. This silsesquioxane resin was then used to prepare a Masterbatch according to the procedure outlined above. The Masterbatch, produced with 8 weight percent of the candidate resin and 0.3 weight percent char catalyst, was then mixed with a thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

EXAMPLE 2

Masterbatch containing a silsesquioxane resin having the average molecular formula (MeHSiO$_{2/2}$)$_{0.25}$(PhSiO$_{3/2}$)$_{0.75}$ where Me denotes methyl and Ph denotes phenyl.

Phenyltrimethoxysilane (813.5 g) was hydrolyzed with deionized water (346.7 g) in the presence of trifluoromethanesulfonic acid (2.03 g). Volatile material (1006.2 g) was removed via distillation. After cooling to 50° C., toluene (892.4 g) and additional deionized water (173.3 g) were added. Additional volatile material was removed via distillation to a reaction mixture temperature of 75° C. Additional toluene (671.9 g), methylhydrogen cyclic siloxanes (—(MeHSiO)$_x$—) (404.5 g), and glacial acetic acid (404.5 g) were sequentially added and the reaction mixture stirred at 75° C. for five hours, then washed with deionized water, aqueous NaHCO$_3$ and more deionized water. Residual water in the organic phase azeotropically removed, then the organic solvent removed by stripping under reduced pressure to yield 2915.5 grams of a solid material. The solid material was identified by $^{29}$Si NMR as a silsesquioxane resin having the average molecular formula: (MeHSiO$_{2/2}$)$_{0.25}$(PhSiO$_{3/2}$)$_{0.75}$ where Me denotes methyl and Ph denotes phenyl. This silsesquioxane resin was then used to prepare a Masterbatch, produced with 8 weight percent of the candidate resin and 0.3 weight percent char catalyst, according to the procedure outlined above. The Masterbatch was then mixed with the thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

EXAMPLE 3

Masterbatch containing a silsesquioxane resin having the average molecular formula (Me$_3$SiO$_{1/2}$)$_{0.10}$(MeHSiO$_{2/2}$)$_{0.19}$ (PhSiO$_{3/2}$)$_{0.71}$ where Me denotes methyl and Ph denotes phenyl.

Phenyltrimethoxysilane (396 g) was reacted with water (54 g) in the presence of toluene (300 g) and trifluoromethanesulfonic acid (0.2 g) and heated to 70° C. Volatiles were removed via distillation at this temperature over a three-hour period. Additional toluene (300 g) and methylhydrogen cyclic siloxanes (34 g) were added and the mixture held at 70° C. for an additional three hours. Hexamethyldisiloxane (24 g) was added with additional heating at 70° C. for an additional two hours. After cooling, NaHCO3 (2 g) was added and the mixture washed three times with water (1500 g total). Volatiles were stripped at 50° C. under reduced pressure to produce a white solid product (310 g). The white solid product was identified by $^{29}$Si NMR as a silsesquioxane resin having the average molecular formula: (Me$_3$SiO$_{1/2}$)$_{0.10}$(MeHSiO$_{2/2}$)$_{0.19}$(PhSiO$_{3/2}$)$_{0.71}$ where Me denotes methyl and Ph denotes phenyl. This silsesquioxane resin was then used to prepare a Masterbatch according to the procedure outlined above. The Masterbatch, produced with 8 weight percent of the candidate resin and 0.3 weight percent of char catalyst, was then mixed with the thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

EXAMPLE 4

About 3 weight percent of Polytetrafluoroethylene Powder was added to the Masterbatch prepared in Example 1 with polycarbonate as the plastic resin. This Masterbatch, produced with 8 weight percent of the candidate resin and 0.3 weight percent of char catalyst, was then mixed with thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

EXAMPLE 5

About 3 weight percent of Polytetrafluoroethylene Powder was added to the Masterbatch prepared in Example 2 with polycarbonate as the plastic resin. This Masterbatch, produced with 8 weight percent of the candidate resin and 0.3 weight percent char catalyst, was then mixed with thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

EXAMPLE 6

About 3 weight percent of Polytetrafluoroethylene Powder was added to the Masterbatch prepared in Example 3 with polycarbonate as the plastic resin. This Masterbatch, produced with 8 weight percent of the candidate resin and 0.3 weight percent char catalyst, was then mixed with thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

COMPARISON EXAMPLE 1

Masterbatch containing $(Me_2HSiO_{1/2})_{0.22}(PhSiO_{3/2})_{0.54}(PrSiO_{3/2})_{0.23}$ where Me denotes methyl, Ph denotes phenyl, and Pr denotes propyl.

A phenyl propyl silicone resin in solid flake form (1000 g) was dissolved in toluene (667 g), heated to remove residual water via azeotropic distillation, and cooled to ambient temperature. Dimethylchlorosilane (490 g) was added to the solution and the mixture heated to 39° C. for three hours, then stirred at ambient temperature for 18 hours. Volatile material was removed until the head temperature reached 110° C., then the mixture cooled to 30° C. Water (45.8 g) was added and removed via azeotropic distillation, additional water (100 g) added and azeotropically removed, then isopropanol (88 g) added and all volatiles removed by distillation at ambient, then reduced, pressure. The hot molten material was poured onto a cooled metal surface. A portion of the resulting friable solid (502.2 g) was dissolved in dimethoxyethane (500.1 g) and mixed with dimethylchlorosilane (72.3 g). The mixture was heated to 35° C. for four hours, then concentrated under reduced pressure to a viscous liquid. Additional dimethoxyethane (310.1 g) and deionized water (50.0 g) were added and all volatiles removed under reduced pressure. Again, dimethoxyethane (199.9 g) and deionized water (39.7 g) were added and heated to reflux for 90 minutes, then all volatiles removed under reduced pressure. The hot molten product was poured onto a cooled metal surface. The resulting product was isolated as a friable solid. The product was identified by $^{29}Si$ NMR as a silsesquioxane resin having the average molecular formula: $(Me_2HSiO_{1/2})_{0.22}(PhSiO_{3/2})_{0.54}(PrSiO_{3/2})_{0.23}$ where Me denotes methyl, Ph denotes phenyl, and Pr denotes propyl. This silsesquioxane resin was then used to prepare a Masterbatch according to the procedure outlined above. The Masterbatch, produced with 8 weight percent of the candidate resin and 0.3 weight percent of char catalyst, was then mixed with the thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

COMPARISON EXAMPLE 2

A Masterbatch, with polycarbonate as the plastic resin, was prepared using the procedure outlined above using Toshiba XC99-B5664 (a siloxane resin having the average molecular formula $(Me_3SiO_{1/2})_{0.121}(Me_2SiO_{2/2})_{0.157}(PhSiO_{3/2})_{0.578}(MeSiO_{3/2})_{0.145}$ where Me denotes methyl and Ph denotes phenyl) as the Siloxane Resin. This Masterbatch, produced with 8 weight percent of the candidate resin and 0.3 weight percent of char catalyst, was then mixed with thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

COMPARISON EXAMPLE 3

Masterbatch containing $(Me_3SiO_{1/2})_{0.188}(PhSiO_{3/2})_{0.812}$ where Me denotes methyl and Ph denotes phenyl.

A mixture of phenyltrichlorosilane (720.1 g) and trimethylchlorosilane (92.8 g) were hydrolyzed with a mixture of water (640 g) and toluene (519.9 g) cooled in an ice bath. The reaction mixture was heated to 80° C. for 3 hours, then 90° C. for 18 hours. Aqueous sodium chloride, additional toluene and a small amount of methanol were added to facilitate the phase removal of the aqueous phase. The portion of mixture that was not readily phase separating was filtered and the organic layers combined and heated to 66° C. for 40 minutes. This was washed sequentially with saturated aqueous $NaHCO_3$ and aqueous NaCl. Residual water was removed via azeotropic distillation. The product mixture was again filtered, then solvent removed by stripping under reduced pressure and the hot molten product was poured onto a cooled metal surface. The resulting product was isolated as a friable solid. The product was identified by $^{29}Si$ NMR as a silsesquioxane resin having the average molecular formula: $(Me_3SiO_{1/2})_{0.188}(PhSiO_{3/2})_{0.812}$ where Me denotes methyl and Ph denotes phenyl. This silsesquioxane resin was then used to prepare a Masterbatch according to the procedure outlined above with polycarbonate as the plastic resin. The Masterbatch, produced with 8 weight percent of the candidate resin and 0.3 weight percent of char catalyst, was then mixed with the thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

COMPARISON EXAMPLE 4

About 3 weight percent of Polytetrafluoroethylene Powder was added to the Masterbatch prepared in Comparison Example 3. This Masterbatch, produced with 8 weight percent of the candidate resin and 0.3 weight percent char catalyst, was then mixed with thermoplastic resin at a weight ratio of thermoplastic resin to Masterbatch of 10:1 in a twin-screw extruder, molded according to the UL 94 test piece procedure and subjected to UL94 Flame Test. The final formulation is shown in Table 1 below. The results are shown in Table 2 below.

TABLE 1

| | Final Formulation | | | |
| --- | --- | --- | --- | --- |
| Example | Thermoplastic Resin (balance to 100 wt %) | Wt % Silsesquioxane Resin | Wt % Char Catalyst | Wt % Teflon 6C |
| 1 | CALIBRE ® 200-22 | 0.8 | 0.03 | 0.0 |
| 2 | " | 0.8 | 0.03 | 0.0 |
| 3 | " | 0.8 | 0.03 | 0.0 |
| 4 | " | 0.8 [a] | 0.03 | 0.3 |
| 5 | " | 0.8 [b] | 0.03 | 0.3 |
| 6 | " | 0.8 [c] | 0.03 | 0.3 |
| CE1 | " | 0.8 | 0.03 | 0.0 |
| CE2 | " | 0.8 | 0.03 | 0.0 |
| CE3 | " | 0.8 | 0.03 | 0.0 |
| CE4 | " | 0.8 [d] | 0.03 | 0.3 |

[a] same silsesquioxane resin as used in example 1
[b] same silsesquioxane resin as used in example 2
[c] same silsesquioxane resin as used in example 3
[d] same silsesquioxane resin as used in comparative example 3

TABLE 2

| FR Additive* | Flame Time (seconds) | | | Cotton Ignition | UL 94 Rating |
|---|---|---|---|---|---|
| | Set 1 | Set 2 | Total 1 + 2 | | |
| Example 1 | 22 | 17 | 39 | Y | 2 |
| Example 2 | 11 | 18 | 29 | N | 0 |
| Example 3 | 15 | 14 | 29 | Y | 2 |
| Example 4 | 36 | 41 | 77 | N | 0 |
| Example 5 | 7 | 17 | 24 | Y | 2 |
| Example 6 | 9 | 20 | 29 | N | 0 |
| Comparison Example 1 | 105 | 16 | 121 | Y | 2 |
| Comparison Example 2 | 57 | 41 | 98 | Y | 2 |
| Comparison Example 3 | 51 | 37 | 88 | Y | 2 |
| Comparison Example 4 | 44 | 56 | 100 | Y | 2 |
| Emerge ® 8500* | 30 | 47 | 77 | Y | 2 |

*test sample dimension 125 × 13 × 1 mm

EXAMPLES 7-26 AND COMPARISON EXAMPLES 5-9

A Masterbatch containing 10 or 50 weight percent of a silsesquioxane resin having the average molecular formula $(MeHSiO_{2/2})_{0.25}(PhSiO_{3/2})_{0.75}$ where Me denotes methyl and Ph denotes phenyl were produced according to the procedure outlined above. The specific thermoplastic resin used in the fire test is described in Table 2 below and was mixed with the Masterbatch in a 10:1 weight ratio mixture of thermoplastic resin to Masterbatch in a twin-screw extruder. The final formulation is shown in Table 3 below. All of these Fire Retarded experiments were performed using ASTM E 1354 with an external heat flux at 90 kW/m². In Table 3, a negative number denotes a reduction of Fire Retardant feature (an improvement) when compared to the virgin resin or blend. For example, the Heat Release Rate is reduced (negative) and is a slower burning fire, thus improved. In Comparison Examples 5-9, non-char forming materials, the Heat Release Rate is positive, thus not an improvement. By virgin, it is meant that the candidate plastic resin is not altered in any way before the burn. It is simply injection molded into the plaques described. The virgin blend is simply the mixture of polycarbonate blended with ABS, PBT, etc. at 85 wt % polycarbonate and 15 wt % blended polymer, also unaltered and molded.

TABLE 3

| Example | Thermoplastic or Thermoset Resin Type (balance to 100 wt %) | Wt % silsesquioxane resin | Wt % Char Catalyst | Wt % Teflon 6C | Delta Avg HRR-Control | Delta Peak Heat Release | Delta Peak CO Release kg/kg | Delta Peak CO2 Release |
|---|---|---|---|---|---|---|---|---|
| 7 | PELLETHANE ® 2355-75A | 1 | 0.03 | 0.3 | −110 | −944 | −0.0084 | −3.835 |
| 8 | | 1 | 0.00 | 0.0 | −24 | −768.5 | −0.07255 | −6.295 |
| 9 | | 5 | 0.03 | 0.3 | −692 | −1443 | 0.28825 | −0.805 |
| 10 | | 5 | 0.00 | 0.0 | −286.5 | −690.5 | −0.6248 | −17.365 |
| 11 | | Virgin | | | 0 | 0 | 0 | 0 |
| 12 | CALIBRE ® 200-22 (85%) | 1 | 0.03 | 0.3 | −478.5 | −738 | 0.3825 | 7.025 |
| 13 | CRASTIN ® 6129(15%) | 1 | 0.00 | 0.0 | −243.5 | −630.5 | 8.9275 | 180.15 |
| 14 | | 5 | 0.03 | 0.3 | −535 | −1013.5 | 0.3635 | 7.39 |
| 15 | | 5 | 0.00 | 0.0 | −437 | −720 | 2.54675 | 61.74 |
| 16 | | Virgin blend | | | 0 | 0 | 0 | 0 |
| 17 | CALIBRE ® 200-22 (85%) MAGNUM ® (15%) | 1 | 0.03 | 0.3 | −1002.5 | −521 | 0.195 | 2.6 |
| 18 | | 1 | 0.00 | 0.0 | −1405.5 | −1638 | 1.0455 | 20.17 |
| 19 | | 5 | 0.03 | 0.3 | −1036 | −657 | 2.4795 | 28.13 |
| 20 | | 5 | 0.00 | 0.0 | −189 | −46 | 0.20545 | 4.72 |
| 21 | | Virgin blend | | | 0 | 0 | 0 | 0 |
| 22 | CRASTIN ® 6129 | 1 | 0.03 | 0.3 | −131 | −585.5 | −1.1642 | −43.105 |
| 23 | | 1 | 0.00 | 0.0 | −2694 | 4200 | −1.6595 | −54.7 |
| 24 | | 5 | 0.03 | 0.3 | −1033 | −1500 | 1.5329 | −52.54 |
| 25 | | 5 | 0.00 | 0.0 | 662 | 141.5 | −1.375 | −46.36 |
| 26 | | Virgin | | | 0 | 0 | 0 | 0 |
| Comparison Example5 | AMOCO ® 4018 | 1 | 0.03 | 0.3 | 514 | 57.5 | −0.35315 | −1.575 |
| Comparison Example6 | | 1 | 0.00 | 0.0 | 233 | 768.5 | 8.11185 | 174.455 |
| Comparison Example7 | | 5 | 0.03 | 0.3 | 1893 | 2125.5 | −0.34365 | 1.745 |
| Comparison Example8 | | 5 | 0.00 | 0.0 | 248.5 | 332.5 | 2.08335 | 35.585 |
| Comparison Example9 | | Virgin | | | 0 | 0 | 0 | 0 |

The examples of the invention thermoplastics with excellent flame retardant behavior without the use of Polytetrafluoroethylene Powder (Telfon®) halogen-containing additives. Addition of Polytetrafluoroethylene Powder to the flame retarded compositions of this invention in some cases further improved the flame retardant and UL94 behavior of the compositions of this invention.

The invention claimed is:

1. A flame retardant composition comprising:
   (a) 81 to 99.99 weight percent of a thermoplastic resin, thermoset resin, thermoplastic resin blend, or thermoset resin blend which upon burning forms a char; and
   (b) 0.01-19 weight percent of a silsesquioxane resin having a weight average molecular weight of greater than 300 and having the average molecular formula:

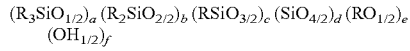

wherein each R is hydrogen, methyl, or phenyl, a and b are zero or positive numbers and the value of a+b is greater than zero, c is a positive number, d, e and f are zero or positive numbers with the provisos that the copolymer comprises at least 40 mole percent of $RSiO_{3/2}$ units, the copolymer comprises less than 10 mole percent $SiO_{4/2}$ units, greater than 30 mole percent of the silicon-bonded R groups are silicon-bonded phenyl groups, at least 13 mole percent of the silicon-bonded R groups are silicon-bonded hydrogen atoms, the content of silicon-bonded hydroxyl groups is equal to or less than 2 weight percent, and the content of silicon-bonded alkoxy groups where the alkoxy group is methoxy or ethoxy is equal to or less than 5 weight percent.

2. A composition according to claim 1, wherein (a) is selected from polycarbonates, polyamides, polyesters, blends of polycarbonates with other polymers, polyphenylene ether, polyphenyleneoxide, blends of polyphenylene ether with styrenics, blends of polyphenyleneoxide with styrenic materials, polyaramids, polyimides, phenyl-containing resins having a rigid rod structure, styrenic materials, polyacrylates, styrene-acrylonitrile resins, halogenated plastics, polyketones, polymethylmethacrylate (PMMA), thermoplastic elastomers, cellulosics, rayon, or polylactic acid.

3. A composition according to claim 2, wherein the styrenic materials are selected from acrylonitrile-butadiene-styrene, polystyrene, or high-impact polystyrene.

4. A composition according to claim 1, wherein (a) is selected from epoxy resins, phenolic resins, urethane elastomers, or blends thereof.

5. A composition according to claim 1, wherein (b) comprises 60 to 90 mole percent of $RSiO_{3/2}$ units, less than 5 mole percent of $SiO_{4/2}$ units, 50 to 80 mole percent silicon-bonded phenyl groups, 0.5 to 1.2 weight percent silicon-bonded hydroxyl groups, and less than 5 percent silicon-bonded alkoxy groups where the alkoxy group is methoxy or ethoxy.

6. A composition according to claim 1, wherein (b) is $(Me_2HSiO_{1/2})_a(PhMeSiO_{2/2})_b(Me_2SiO_{2/2})_b(PhSiO_{3/2})_c$, $(MeHSiO_{2/2})_b(PhSiO_{3/2})_c$, or $(Me_3SiO_{1/2})_a(MeHSiO_{2/2})_b(PhSiO_{3/2})_c$.

7. A composition according to claim 1, wherein the composition further comprises a sodium-containing catalyst.

8. A composition according to claim 1, wherein the compositions further comprise polytetrafluoroethylene powder.

9. A composition according to claim 1, wherein (a) is selected from polycarbonates, polycaprolactam, polylauryllactam, polyhexamethyleneadipamide, polyhexamethylenedodecanamide, blends of Nylons with other polymers, polybutylene terephthalate, polyethylene terephthalate, polyethylene naphthalate, polycarbonate-acrylonitrile-butadiene-styrene blends, polycarbonate-polybutylene terephthalate blends, polyphenylene ether, polyphenyleneoxide, polyphenylene sulfide, polyether sulphone, polyethylene sulfide, acrylonitrile-butadiene-styrene, polystyrene, high-impact polystyrene, styrene-acrylonitrile resins, polyvinyl chloride, fluoroplastics, polymethylmethacrylate, thermoplastic urethanes, thermoplastic vulcanizates, or styrene ethylene butylene styrene copolymer.

10. A composition according to claim 9, wherein (b) comprises 60 to 90 mole percent of $RSiO_{3/2}$ units, less than 5 mole percent of $SiO_{4/2}$ units, 50 to 80 mole percent silicon-bonded phenyl groups, 0.5 to 1.2 weight percent silicon-bonded hydroxyl groups, and less than 5 percent silicon-bonded alkoxy groups where the alkoxy group is methoxy or ethoxy.

11. A composition according to claim 9, wherein (b) is $(Me_2HSiO_{1/2})_a(PhMeSiO_{2/2})_b(Me_2SiO_{2/2})_b(PhSiO_{3/2})_c$, $(MeHSiO_{2/2})_b(PhSiO_{3/2})_c$, or $(Me_3SiO_{1/2})_a(MeHSiO_{2/2})_b(PhSiO_{3/2})_c$.

12. A composition according to claim 10, wherein the composition further comprises a sodium-containing catalyst.

13. A composition according to claim 11, wherein the composition further comprises a sodium-containing catalyst.

14. A composition according to claim 12, wherein the compositions further comprise polytetrafluoroethylene powder.

15. A composition according to claim 13, wherein the compositions further comprise polytetrafluoroethylene powder.

16. A composition according to claim 1 wherein (b) comprises 60 to 90 mole percent of $RSiO_{3/2}$ units, less than 5 mole percent of $SiO_{4/2}$ units, 50 to 80 mole percent silicon-bonded phenyl groups, 13 to 20 mole percent silicon-bonded hydrogen atoms, 0.5 to 1.2 weight percent silicon-bonded hydroxyl groups, and less than 5 percent silicon-bonded alkoxy groups where the alkoxy group is methoxy or ethoxy.

17. A composition according to claim 1 wherein (b) comprises 60 to 90 mole percent of $RSiO_{3/2}$ units, less than 5 mole percent of $SiO_{4/2}$ units, 50 to 80 mole percent silicon-bonded phenyl groups, 13.7 to 20 mole percent silicon-bonded hydrogen atoms, 0.5 to 1.2 weight percent silicon-bonded hydroxyl groups, and less than 5 percent silicon-bonded alkoxy groups where the alkoxy group is methoxy or ethoxy.

18. A composition according to claim 14 wherein (b) comprises 60 to 90 mole percent of $RSiO_{3/2}$ units, less than 5 mole percent of $SiO_{4/2}$ units, 50 to 80 mole percent silicon-bonded phenyl groups, 13.7 to 20 mole percent silicon-bonded hydrogen atoms, 0.5 to 1.2 weight percent silicon-bonded hydroxyl groups, and less than 5 percent silicon-bonded alkoxy groups where the alkoxy group is methoxy or ethoxy.

19. A composition according to claim 1 wherein (b) comprises 13 to 20 mole percent silicon-bonded hydrogen atoms.

20. A composition according to claim 1 wherein (b) comprises 13.7 to 20 mole percent silicon-bonded hydrogen atoms.

* * * * *